(12) United States Patent
Roberts et al.

(10) Patent No.: US 7,421,802 B2
(45) Date of Patent: Sep. 9, 2008

(54) SELF-CLEANING CENTRIFUGAL DRYER SYSTEM AND METHOD THEREOF

(75) Inventors: John P. Roberts, Troutville, VA (US); Charles E. Aaron, Buchanan, VA (US); Roger B. Wright, Staunton, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 0 days.

(21) Appl. No.: 11/351,266

(22) Filed: Feb. 10, 2006

(65) Prior Publication Data

US 2006/0191155 A1 Aug. 31, 2006

Related U.S. Application Data

(63) Continuation-in-part of application No. 10/967,305, filed on Oct. 19, 2004, now Pat. No. 7,171,762.

(51) Int. Cl.
*F26B 5/08* (2006.01)

(52) U.S. Cl. .................. 34/312; 34/59; 34/166

(58) Field of Classification Search ............... 34/312, 34/59, 166
See application file for complete search history.

(56) References Cited

U.S. PATENT DOCUMENTS

| | | | |
|---|---|---|---|
| 3,458,045 A | 7/1969 | Dudley | |
| 4,090,309 A | 5/1978 | Rollins | |
| 4,123,207 A | 10/1978 | Dudley | |
| 4,218,323 A | 8/1980 | McCracken | |
| 4,476,019 A | 10/1984 | Nowisch et al. | |
| 4,561,903 A * | 12/1985 | Blaul ........................ | 134/10 |
| 4,565,015 A | 1/1986 | Hundley, III | |
| 4,570,359 A | 2/1986 | Rudolph | |
| 4,833,793 A | 5/1989 | White | |
| 4,896,435 A | 1/1990 | Spangler, Jr. | |
| 5,074,057 A | 12/1991 | Kanai | |
| 5,182,008 A | 1/1993 | Shelstad | |
| 5,187,880 A | 2/1993 | Rudolph | |
| 5,197,205 A | 3/1993 | Spada et al. | |
| 5,265,347 A | 11/1993 | Woodson et al. | |
| 5,333,396 A | 8/1994 | Kanai | |
| 5,505,537 A | 4/1996 | Previero | |
| 5,512,085 A * | 4/1996 | Schwab ........................ | 95/200 |
| 5,611,150 A | 3/1997 | Yore, Jr. | |
| 5,638,606 A | 6/1997 | Bryan et al. | |
| 5,987,769 A | 11/1999 | Ackerman et al. | |
| 6,237,244 B1 | 5/2001 | Bryan et al. | |

(Continued)

FOREIGN PATENT DOCUMENTS

DE 31 20 792 A1 12/1982

(Continued)

*Primary Examiner*—S. Gravini
(74) *Attorney, Agent, or Firm*—Jacobson Holman PLLC

(57) ABSTRACT

A self-cleaning centrifugal dryer system and method for removing surface moisture allow complete removal of plastic pellets, flakes and particles from the dryer and water-conveying or water processing system during or after each drying cycle. By eliminating plastic particulate retention in the dryer and throughout the water conveyance and processing systems whereby contamination of different type materials dried during a subsequent drying cycle is avoided. Air and water alone or in combination under pressure are discharged toward various accumulation or occlusion ("hang-up") points in the dryer and throughout the water-conveying or processing system to remove retained plastic pellets, flakes and particles.

19 Claims, 11 Drawing Sheets

U.S. PATENT DOCUMENTS 6,430,842 B1 8/2002 Hauch
6,739,457 B2 5/2004 Humphries, II et al.
6,807,748 B2 10/2004 Bryan et al.

FOREIGN PATENT DOCUMENTS

| | | |
|---|---|---|
| DE | 43 38 030 C1 | 11/1994 |
| FR | 330 215 | 3/1903 |
| WO | WO 97/41290 | 11/1997 |

\* cited by examiner

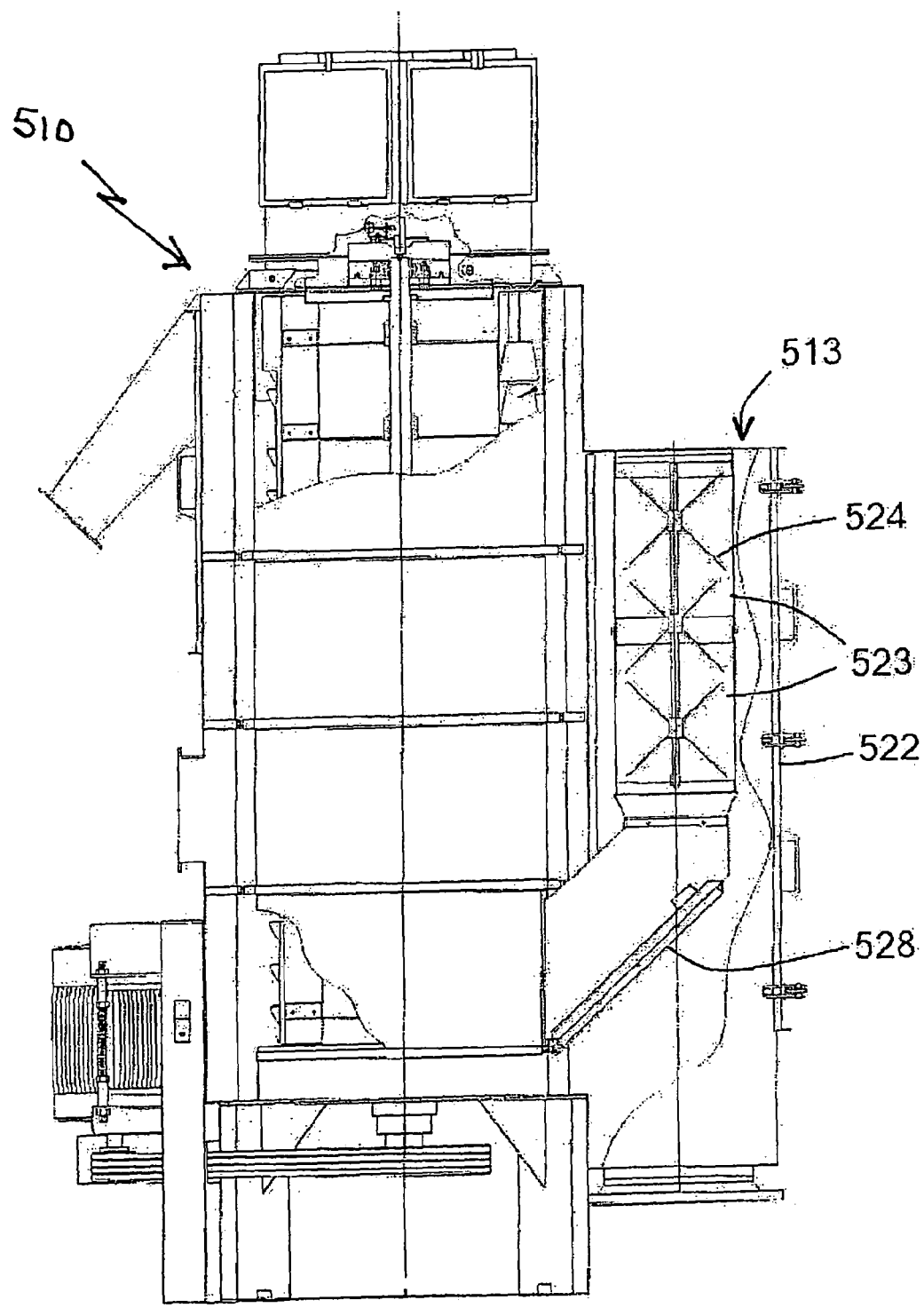

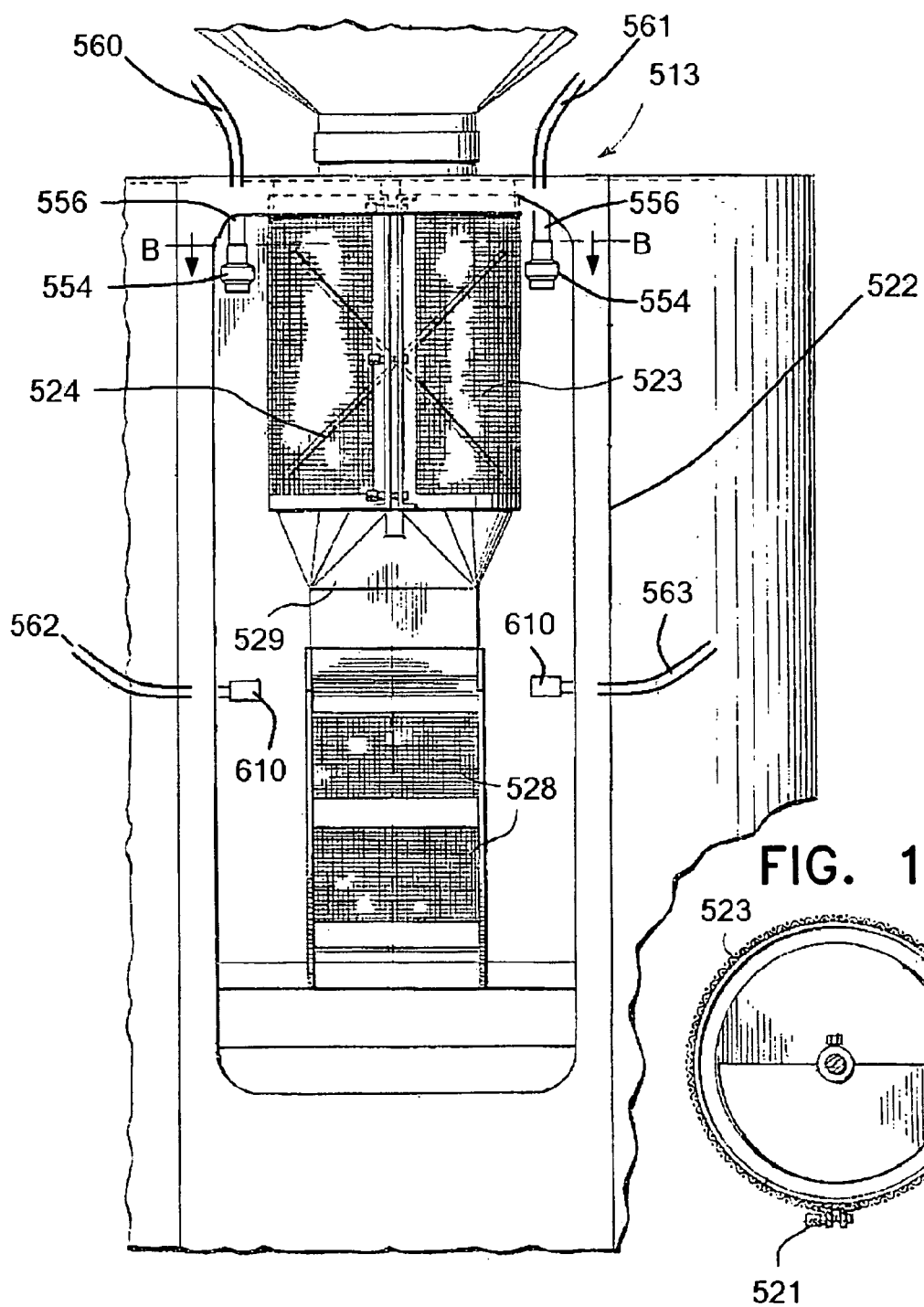

SELF-CLEANING CENTRIFUGAL DRYER SYSTEM AND METHOD THEREOF

CROSS REFERENCE TO RELATED APPLICATION

This patent application is a continuation-in-part of U.S. patent application Ser. No. 10/967,305 filed Oct. 19, 2004 now U.S. Pat. No. 7,171,762, both of which are commonly owned by the same assignee.

FIELD OF THE INVENTION

The present invention generally relates to a centrifugal dryer system and more specifically to a self-cleaning dryer, water-conveying system, and/or water processing system, and method for removing surface moisture from plastic pellets, flakes, or particles discharged into the dryer in the form of a slurry in water and eliminating plastic particulate retention in the dryer and throughout the water conveyance and processing systems whereby contamination of different type materials dried during a subsequent drying cycle is avoided. Air or water alone or in combination under pressure is discharged toward various accumulation or occlusion points in the dryer and throughout the water-conveying or processing systems to remove retained plastic particles, flakes, or pellets.

BACKGROUND OF THE INVENTION

Underwater pelletizers which produce a pelletized product in the form of a slurry of pellets and water are well known for many years in the pelletizing industry as well as in patents of the assignee from as early as U.S. Pat. No. 4,123,207 issued Oct. 31, 1978. Centrifugal dryers are also well known in the prior art and have been disclosed by the assignee as early as U.S. Pat. No. 3,458,045 issued Jul. 29, 1969, and more recently in U.S. Pat. Nos. 5,265,347 (issue date Nov. 30, 1993), 6,237,244 (issue date May 29, 2001), 6,739,457 (issue date May 25, 2004), and 6,807,748 (issued Oct. 26, 2004). Details of these patents are included herein, in whole or in part, by way of reference.

The centrifugal pellet dryers in the prior art satisfactorily dry plastic particles, and particularly plastic pellets when properly operated. However, existing dryers have areas in which the plastic pellets and particles, and particularly plastic flakes, being dried, become lodged, form occlusions, or otherwise, accumulate. These areas are generally known as hang-up points in which pellets or plastic flakes or particles remain after a drying cycle has been completed. The pellets, flakes or particles lodged in various hang-up points may present a contamination problem in sequential drying cycles even when the same pellet slurry is supplied to the dryer.

Of more significant concern, a centrifugal dryer is commonly used to dry different plastic particles during sequential drying cycles. When a subsequent drying cycle is drying plastic particles different from those in a previous drying cycle, some of the particulates of the previous drying cycle that have been lodged in the hang-up points will be entrained in and mixed with different plastic pellets, flakes, or particles being dried in a subsequent drying cycle. This circumstance results in contamination of the plastic particles being dried in the subsequent drying cycle by those retained in the hang-up points during a previous drying cycle.

The build-up of plastic particles during water conveyance or processing may lead to hang-up points in other parts of the system other than the dryer, or may restrict flow through the system by clogging or occlusion, and may lead to downstream contamination where plastic particles are released from the hang-up points, clogs or occlusions, periodically and unpredictably.

The present invention is a self-cleaning dryer, water-conveying system and/or water processing system and a method of use which overcome the problems of hang-up points in prior art dryers as well as in the water conveying and processing systems similarly contaminated by hang-up points and occlusions by eliminating the particulate build-up from the hang-up points, clogs, and occlusions. Thus, contamination of plastic pellets, flakes or particles being dried in a drying cycle by residuals retained in various hang-up points, clogs, or occlusions during a previous drying cycle in which different particulates were processed is avoided.

SUMMARY OF THE INVENTION

The centrifugal dryer and water conveying and processing system in accordance with this invention includes a combination of high pressure air and/or water directed toward the hang-up points or areas of the dryer in which pellets, flakes, or particles being dried have become lodged as well as similar hang-up points, clogs or occlusions in the related water-conveyance and processing system. The self-cleaning method eliminates contamination of plastic particulates subsequently passing through the dryer by previously dried particulates that have become lodged in the afore-mentioned hang-up points, clogs, or occlusions.

The self-cleaning dryer and method of the present invention enable complete removal of all plastic pellets, flakes, or particles from the dryer and subsequent systems during one drying cycle thereby eliminating contamination of plastic particulates being dried in a subsequent drying cycle. The air and water pressure are discharged toward various hang-up points throughout the dryer and water systems. Timing controls operate various stages of the discharge of the pressurized air and water. As used in this specification, the term "pressurized fluid" is intended to include pressurized water or other liquid, pressurized air or other gas, or any combination of the foregoing.

For use in accordance with this invention, the air or other gas is preferably pressurized from about 60 psi to about 80 psi, or more, and the water or other liquid is pressurized to flow at a rate of at least 40 gallons per minute (gpm) and is preferably at 80 gpm or more. Combinations of air and water pressure for cleaning purposes herein described are pressurized similarly to the individual parameters stated above.

The self-cleaning centrifugal dryer in accordance with this invention includes a generally vertical housing, a substantially cylindrical foraminous membrane or screen mounted within the housing, and a slurry inlet at a lower end of the housing communicating with the lower end of the screen. The screen includes a perforated, pierced, or laser-cut peripheral wall in spaced relation to the housing. A rotor, provided with inclined radial lifting blades, is mounted inside the screen. The rotor is drivingly connected to a motor and the upper end portion of the screen is communicated with a dried particle discharge chute, and the water separated from the particulates is discharged into an underlying water tank. As used in this specification, the terms "particles" and "particulates" are intended to broadly include pellets, flakes, fines and other solids exiting in the slurry from an underwater pelletizer.

An agglomerate catcher and dewaterer preferably receive the slurry of water and plastic particulates in advance of the dryer. The agglomerate catcher first catches, separates and subsequently discharges agglomerated particulates before the slurry enters the dewaterer. The dewaterer then separates the bulk water from the particulates prior to entrance to the dryer screen at the lower end thereof. Once the water has been removed, the particulates still include surface moisture which is removed during elevational and centrifugal movement of those particulates by rotation of the rotor within the screen and circulation of air by a blower which removes moisture from the interior of the housing. The above described dryer and its operation are representative of well known centrifugal dryers with agglomerate catchers and dewatering devices.

During normal operation of the dryer, some particulates become lodged in hang-up points or areas in the dryer as well as in valves in a water box bypass of the underwater pelletizer. The removal of the particulates in these hang-up points in the self-cleaning dryer of this invention eliminates contamination from a previous drying cycle whereby particles, flakes, or pellets may subsequently be picked up and mixed with particulates of a different type being dried in a subsequent drying cycle. The elimination of this contamination is accomplished by introducing high pressure fluid into the hang-up areas at the end of each drying cycle for one type particulate, thereby cleaning any residual particulates from the dryer before commencing a subsequent drying cycle for another type particle.

The self-cleaning centrifugal dryer of the present invention includes the introduction of timed discharge of pressurized fluid through fixed or movable spray nozzles strategically located to purge or remove particulates lodged in the hang-up points of, or otherwise left in, the dryer and water conveyance or processing systems. Self-cleaning for the dryer is accomplished in part by spray nozzles oriented in circumferentially spaced and vertically staggered relation between the interior of the housing and the exterior of the cylindrical screen. These spray nozzles direct a high pressure fluid against the interior wall of the housing, the exterior wall of the cylindrical screen, and through the cylindrical screen to also flush the area between the rotor and inside surface of the cylindrical screen. When air or other gas is used as the pressurized fluid, dislodged particulates within the screen area are driven out through the dried particle outlet. When water or other liquid is used as the pressurized fluid, any particles lodged in the housing, outside the cylindrical screen, will be flushed to the underlying water tank.

Other high pressure fluid spray nozzles are strategically located to direct the pressurized fluid at other hang-up points. Such other hang-up points include the valves in a water box bypass for the underwater pelletizer, the agglomerate catcher which receives the slurry from the underwater pelletizer, the rotor, the base section of the dryer, the dryer top section, the particle diverter valve located at the end of the dried particulate discharge chute, peripherally in and around the upper walls of the water reservoir, linearly across the topmost outer edge of the fines removal screen, and peripherally spaced and vertically staggered beneath the fines removal screen, as well as peripherally around the dewatering screen or screens and baffles. Additionally, a higher volume blower is communicated with the housing. With the water tank lid open during the cleaning operation, the higher volume blower provides better air circulation through the dryer.

In a preferred embodiment, a water surge is directed into the dryer by injecting high pressure air into the water box bypass line through a vertically and/or positionally maneuverable head. High pressure water at a flow rate of preferably 80 gpm to 100 gpm is directed to the interior of the housing and the exterior of the cylindrical screen through a plurality of spray heads, preferably three or more, circumferentially spaced and vertically staggered around the cylindrical screen. Similarly high pressure water is directionally sprayed toward the walls of and peripherally about the water reservoir through a plurality of spray heads, preferably two or more, per side of the reservoir. Similarly placed linearly across the upper edge of the outer surface of the fines removal screen is a plurality of spray heads, preferably two or more, through which high pressure water is sprayed directionally along the upper surface of the screen. Additionally, a plurality of spray heads, preferably two per side or more, are placed peripherally around the exterior edge of the screen undersurface and optionally may be vertically staggered across that undersurface to rinse fines collected on the surface of the fines screen. Alternatively, high pressure air may be used through the spray nozzles described positionally and linearly along the topmost edge of the outer screen surface or peripherally and vertically staggered around and across the undersurface of the fines screen.

High pressure air is sequentially directed at the top of the rotor adjacent the dryer top section, at the bottom of the rotor adjacent the base section of the dryer and the screen support assembly, at the dried particulate discharge chute and at the diverter valve located at the end of the aforementioned discharge chute. The pressure of the air through the foregoing spray nozzles is preferably about 60 psi to about 80 psi, or more. Preferably, the high pressure air to the bottom of the rotor adjacent the base section of the dryer and screen support assembly is operated continuously inasmuch as this is a particularly vulnerable hang-up point for dried particulates.

Accordingly, it is an object of the present invention to provide a self-cleaning centrifugal dryer and method for removing surface moisture from plastic particulates introduced to the dryer as a slurry in water in order to eliminate contamination between different particles being dried in sequential drying cycles during operation of the dryer.

Another object of the present invention is to provide self-cleaning centrifugal drying by discharging pressurized fluids into particulate hang-up points or areas within the centrifugal dryer and associated water-conveyance and processing equipment.

A further object of the present invention is to provide a self-cleaning centrifugal dryer and method in which pressurized fluid, preferably high flow rate water, is directed onto or toward various hang-up points by spray nozzles oriented in circumferentially spaced and vertically staggered relation between the interior of the housing and the exterior of the cylindrical screen, peripherally and laterally around the topmost walls of the water reservoir, laterally across the topmost edge of the fines removal screen, and peripherally around and vertically staggered beneath the undersurface of the fines removal screen.

Yet another object of the present invention is to provide a self-cleaning centrifugal dryer and method in accordance with the preceding object which directs pressurized fluid, preferably high pressure air, at specific hang-up points in the dryer including: a diverter valve in the dried particulate outlet; at the top of the rotor inside the dryer top section; from inside the rotor for discharge from the lower end of the rotor toward the base section of the dryer and the screen support assembly; inside the dried particulate chute; and toward the dried particle diverter valve.

A final object of the present invention to be specifically set forth herein is to provide a self-cleaning centrifugal dryer and method in accordance with the preceding objects which will conform to conventional forms of manufacture and operation, and will be economically feasible, long-lasting and relatively trouble-free in use.

These together with other objects and advantages which will become subsequently apparent reside in the details of constructions and operation as more fully hereinafter described and claimed, reference being had to the accompanying drawings forming a part hereof, wherein like numerals refer to like parts throughout. The drawings are intended only to illustrate the present invention and should not be considered to scale.

BRIEF DESCRIPTION OF THE DRAWINGS

FIG. 10 is a schematic sectional view of a dryer with a dewatering device in advance of the dryer in accordance with the present invention and illustrating the spray nozzle positioning.

FIG. 11 is a schematic sectional view showing details of the dewatering device of FIG. 10 with spray nozzles.

FIG. 12 is an expanded schematic sectional view through line B in FIG. 11 showing the vertical dewatering device detail of FIG. 10 and FIG. 11 with spray nozzles.

DETAILED DESCRIPTION OF THE INVENTION

Figure 1:
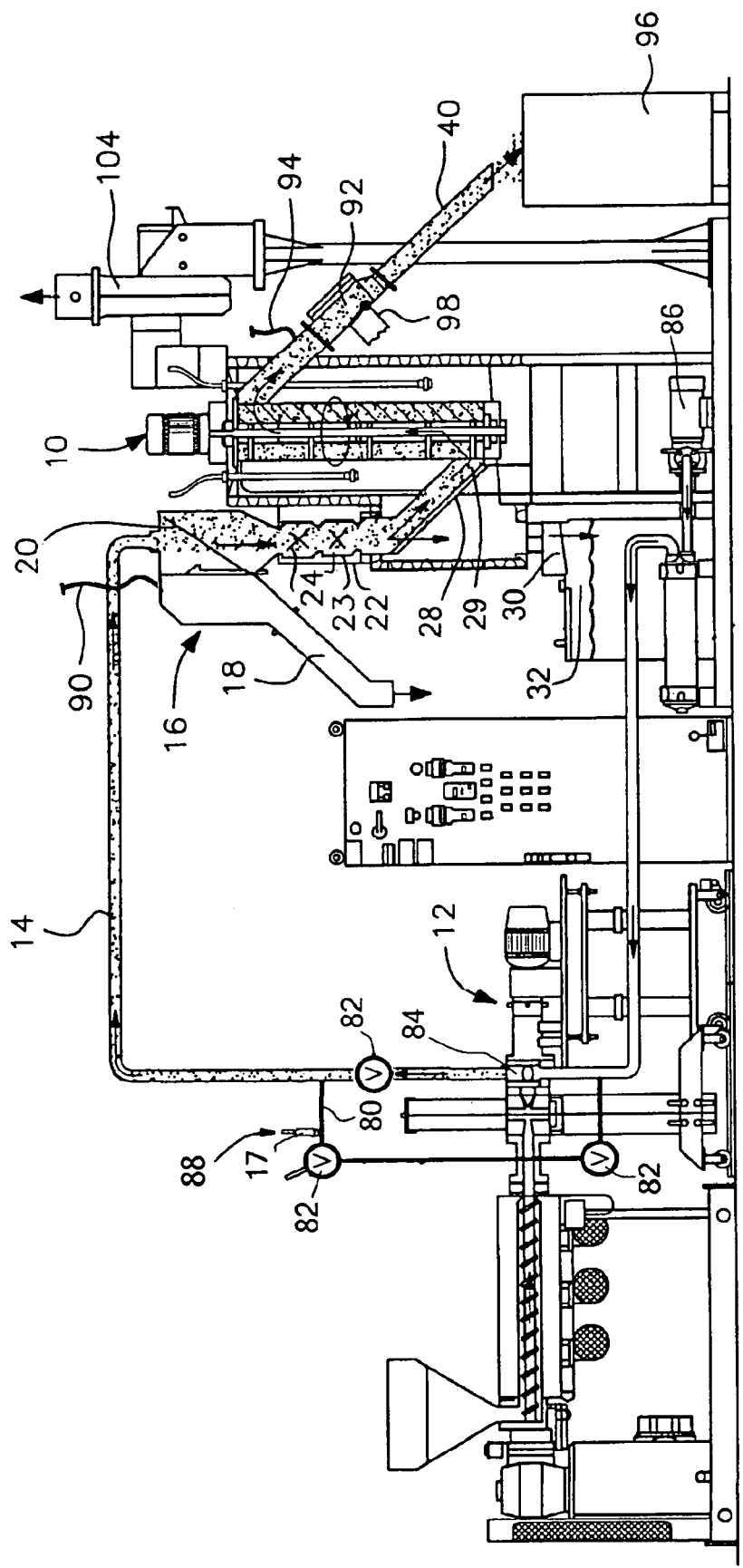
FIG. 1 is a schematic illustration of an underwater pelletizer and centrifugal dryer with water conveyance and processing system in which a self-cleaning system and method of this invention are used.

Although preferred embodiments of the invention are explained in detail, it is to be understood that other embodiments are possible. Accordingly, it is not intended that the invention is to be limited in its scope to the details of constructions and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring specifically to the drawings, a Gala centrifugal dryer modified to incorporate the structure and method of the present invention is illustrated in FIGS. 2-5 and is generally designated by reference numeral 10. FIG. 1 of the drawings schematically illustrates a typical dryer 10, associated with an underwater pelletizer generally designated by reference numeral 12 that produces and discharges a pelletized product in the form of a slurry of pellets, flakes, fines and other solids and water which is conveyed to the pellet dryer 10 through a slurry pipe 14. The pipe 14 discharges the particulates and water slurry into an agglomerate catcher 16 which catches, removes and discharges pellet agglomerates through a discharge chute 18. The agglomerate catcher 16 includes an angled round bar grid, perforated plate or screen 20 which permits passage of water and pellets and smaller particulates but collects agglomerated pellets and directs them toward the discharge chute 18. The particulates and water slurry then pass into a dewaterer 22 which includes at least one vertical or horizontal dewatering foraminous membrane screen 23 containing one or more baffles 24 and/or an inclined foraminous membrane screen 28 that enables water to pass downwardly into a fines removal screen 30 and therethrough to the water reservoir 32. The particulates which still retain moisture on their surfaces are discharged from dewaterer 22 into the lower end of the dryer 10 at a slurry inlet 29.

Figure 2:
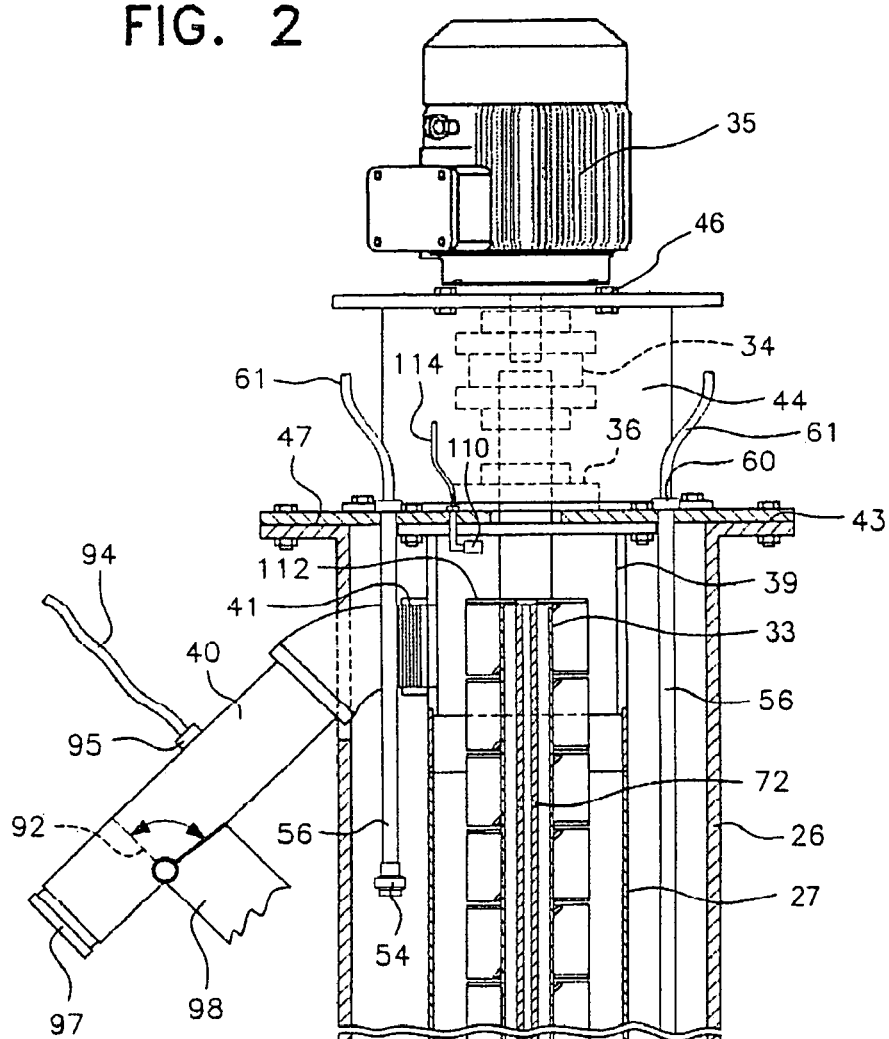
FIG. 2 is a schematic sectional view of one dryer embodying the present invention and illustrating the spray nozzles between the dryer housing and perforated screen as well as the slurry inlet, the dried pellet discharge chute, the water tank, the cylindrical screen, and the rotor and hollow shaft therein.

As illustrated in FIG. 2, the self-cleaning centrifugal particulate dryer 10 includes but is not limited to a generally cylindrical housing 26 having a vertically oriented generally cylindrical screen 27 mounted on a cylindrical screen support 77 at the base of the screen, and a cylindrical screen support 39 at the top of the screen. The screen 27 is thus positioned concentrically within the housing 26 in radially spaced relation from the inside wall of the housing.

A vertical rotor 33 is mounted for rotation within the screen 27 and is rotatably driven by a motor 35 preferably mounted atop the upper end of the dryer. The motor 35 is connected to the rotor 33 by a drive connection 34 and through a bearing 36 connected with the upper end of the housing. The connection 34 and bearing 36 support the rotor 33 and guide the rotational movement of the upper end of the rotor. The slurry inlet 29 is in communication with the lower end of the screen 27 and rotor 33 through the lower screen support section 77 at connection 38, and the upper end of the housing and rotor is in communication with a dried particulate discharge chute 40 through connection 41 in upper screen support section 39 at the upper end of the housing. A diverter plate 92 in outlet 40 can divert dried particles out of exit 97 or exit 98.

The housing 26 is of sectional construction connected at a flanged coupling 42 at a lower end portion of the dryer and a flanged coupling 43 at the upper end portion of the dryer. Flange coupling 43 is connected to a top plate 47 which supports bearing structure 36 and drive connection 34 which are enclosed by a housing or guard 44. A coupling 46 atop the housing 44 supports the motor 35 and maintains all of the components in assembled relation.

The lower end of the housing 26, designated by reference numeral 48, is connected to a bottom plate 100 on top of a water tank or reservoir 32 by a flange connection 50. Apertures 52 communicate the lower end 48 of the dryer housing with the water reservoir 32 for discharge of water from the housing 26 into the water reservoir 32 as the surface moisture is removed from the pellets. This removal is achieved by action of the rotor which elevates the particulates and imparts centrifugal forces to the particulates so that impact against the interior of the screen 27 will remove moisture from the particulates with such moisture passing through the screen and ultimately into the water tank 32 in a manner well known in the art.

The self-cleaning structure of the present invention includes a plurality of spray nozzles or spray heads 54 supported between the interior of the housing 26 and the exterior of the screen 27 as illustrated in FIG. 2. The nozzles 54 are supported at the lower end of spray pipes 56 extending upwardly through top plate 47 at the upper end of the housing with the upper ends 60 of the spray pipes 56 being exposed. Hoses or lines 61 feed high pressure fluid, preferably water at a flow rate of at least 40 gpm, and preferably above 60 gpm, and more preferably at 80 gpm or higher to the spray nozzles 54. The hoses 61 can optionally feed off a single manifold (not shown) mounted on the dryer 10.

There are preferably at least three spray nozzles 54 and related spray pipes 56 and lines 61. The spray nozzles 54 and pipes 56 are oriented in circumferentially spaced relation peripherally of the screen 27 and oriented in staggered vertical relation so that pressurized fluid discharged from the spray nozzles 54 will contact and clean the screen 27, inside and out, as well as the interior of the housing 26. Thus, any collected particulates that may have accumulated or lodged in hang-up points or areas between the outside surface of the screen 27 and inside wall of the housing 26 are flushed through apertures 52 into the water tank 32. Similarly, leftover particulates inside the screen 27 and outside the rotor 33 are flushed out of the dryer and will not contaminate or become mixed with particulates passing through the dryer during a subsequent drying cycle in which a different type pellet is dried.

Figure 3:
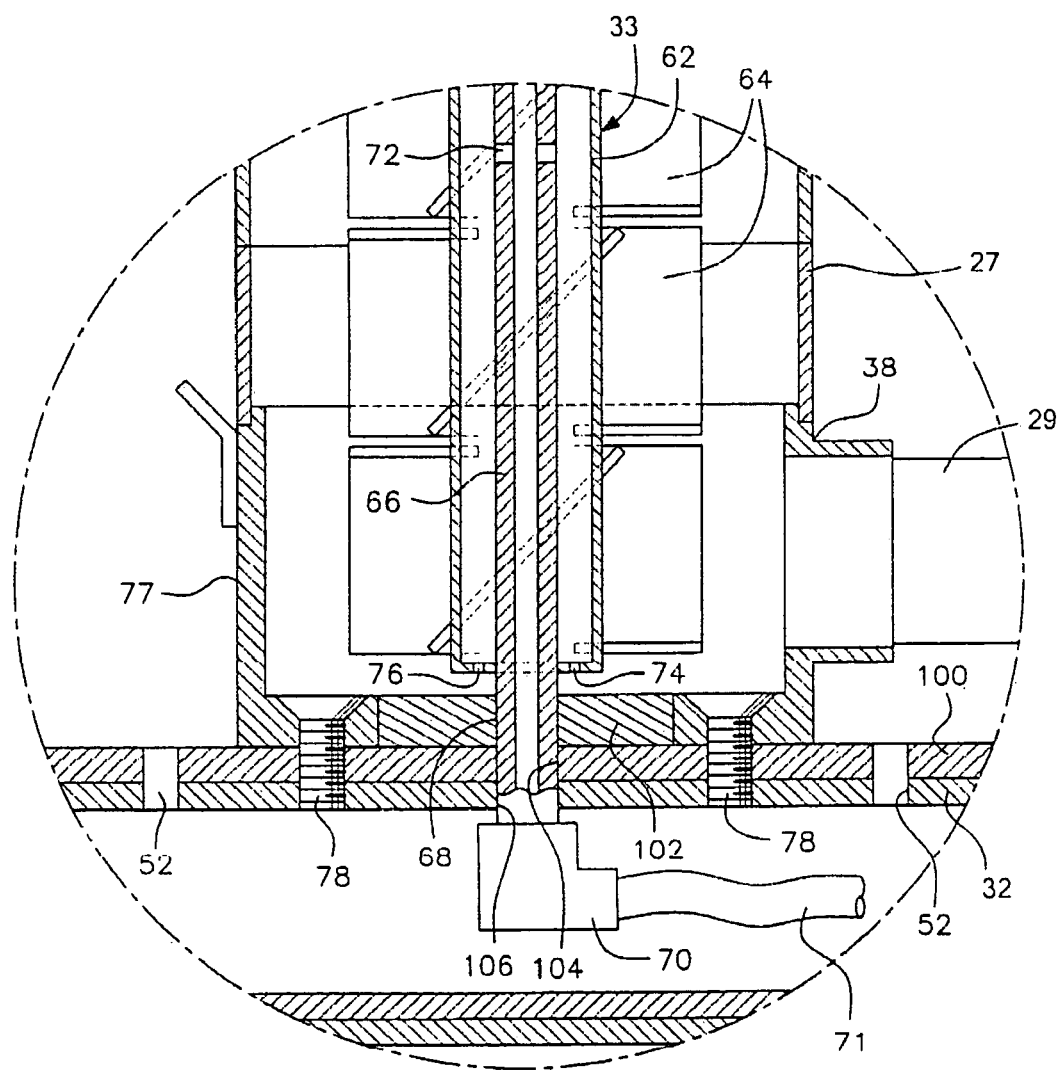
FIG. 3 is an enlarged detailed sectional view from FIG. 2 showing the rotor and illustrating the hollow shaft within the rotor and apertures communicating the interior of the hollow shaft and the interior and exterior of the rotor.

The region between the screen support section 77 at the lower end of the dryer and the inner wall of the housing 26 includes flat areas at the port openings and seams that connect the components of the dryer housing together. The high pressure water from the spray nozzles 54 effectively rinses this region as well. The base screen support section 77 is attached to the bottom plate 100 of the housing 26 and water tank 32 by screws 78 or other fasteners to stationarily secure the housing and screen to the water tank 32. The base screen support section 77 is in the form of a tub or basin as shown in FIG. 2 and FIG. 3. Alternatively, in other dryers the base screen support section 77 may be in the form of an inverted tub or inverted base (not shown).

Figure 4:
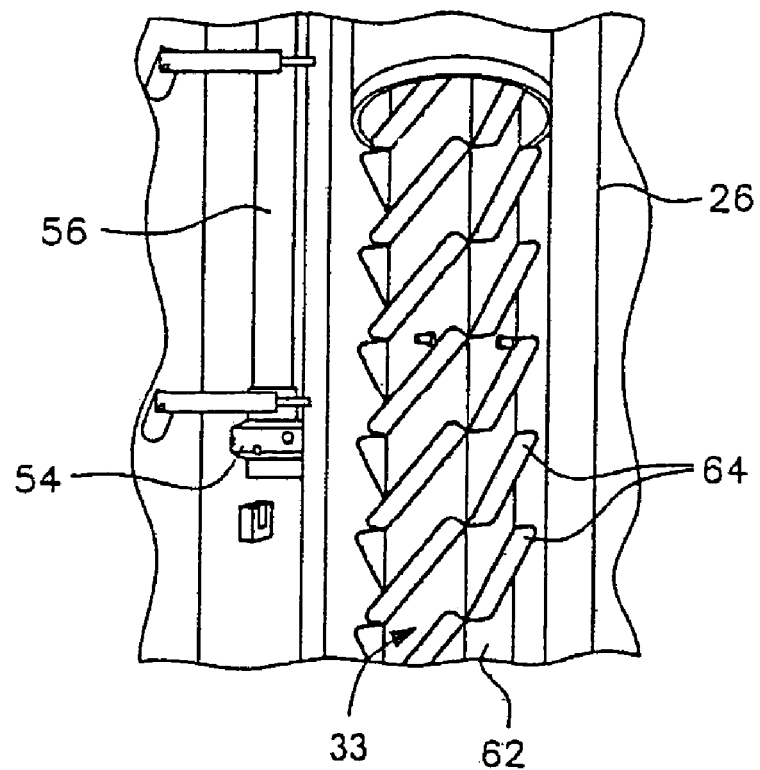
FIG. 4 is a fragmental perspective view inside the dryer of FIG. 2 illustrating the relationship of the dryer housing, rotor and one spray nozzle observed through a door opening in the housing.
Figure 5:
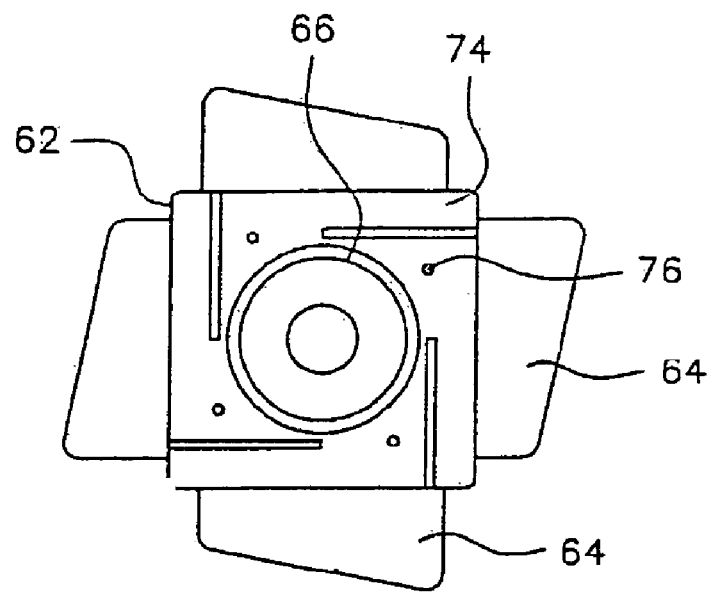
FIG. 5 is a bottom view of the rotor of the dryer of FIG. 2 illustrating the apertures in the lower end of the rotor for spraying the interior of the rotor within the base section of the dryer.
Figure 6:
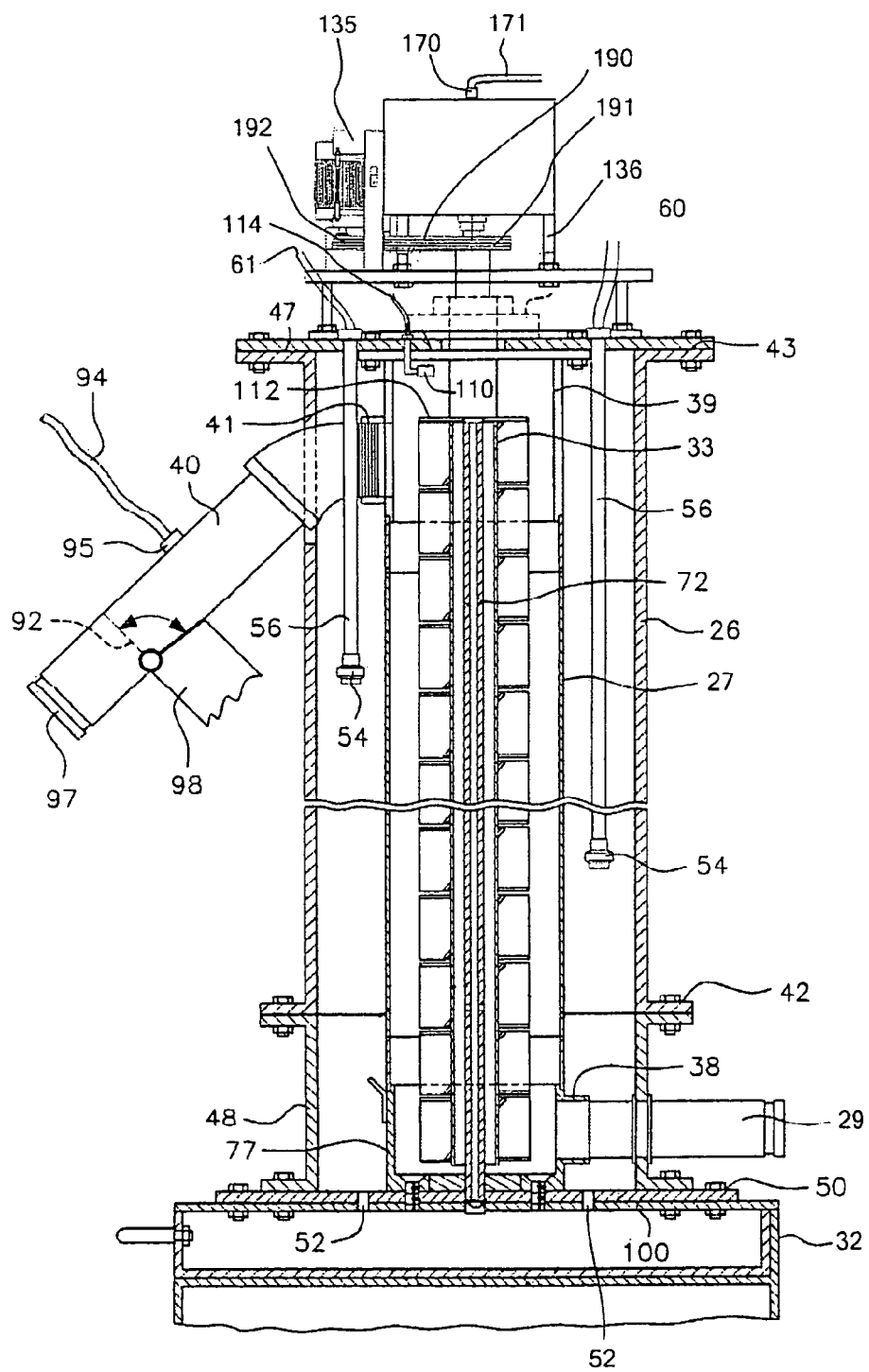
FIG. 6 is a schematic sectional view of another dryer embodying the present invention similar in design and scope to FIG. 2 with an offset motor and pulley drives and stepper motor for variance positionally of the spray tubes and spray nozzles.

Turning to FIGS. 3-5, the rotor 33 includes a substantially square tubular member 62 provided with inclined rotor blades 64 thereon for lifting and elevating the particulates and subsequently impacting them against the screen 27. In other dryers, the rotor 33 can be round, hexagon, octagon or other shape in cross-section. A hollow shaft 66 extends through the rotor 33 in concentric spaced relation to the hollow square member 62 forming the rotor. The hollow shaft guides the lower end of the rotor as it extends through an opening 68 in a guide bushing 102 at the lower end of the rotor, as well as aligned openings 104 and 106 in bottom plate 100 and the top wall of the water tank 32, respectively. A rotary coupling 70 is connected to the hollow shaft 66 and to a source of fluid pressure, preferably air (not shown) through hose or supply line 71 to pressurize the interior of the hollow shaft 66.

The hollow shaft 66 includes apertures 72 to communicate the interior of the hollow rotor member 62 as illustrated in FIGS. 2 and 3. These holes 72 introduce the pressurized fluid, preferably air, into the interior of the rotor 33. The rotor 33 in turn has apertures 76 in bottom wall 74 which communicate the bottom end of the rotor 33 with the interior of the base or tub section 77 to enable the lower end of the rotor 33 and the tub section 77 to be cleaned. Any particulates flushed from the rotor and inside screen 27 are discharged preferentially through the dried pellet outlet chute 40.

The top of the rotor 33 inside top section 39 is also a hang-up point and subjected to high pressure fluid, preferably air, to dislodge accumulated particulates. As shown in FIG. 2, a nozzle 110 directs the high pressure air across the top 112 of the rotor 33 to drive any accumulated particulates out of the top section 39 and preferentially into the pellet outlet chute 40. The nozzle 110 is fed by air hose or line 114 which extends through top plate 47 and is connected to a high pressure air source.

In addition to hang-up points or areas occurring in the dryer structure, another hang-up point occurs in a water box bypass line which includes valves 82 to bypass the water box 84 of the underwater pelletizer 12 as illustrated schematically in FIG. 1. This enables water flow from the pump 86 to directly enter the slurry pipe 14. The valves 82 provide a hang-up point in the water box bypass line 80. To alleviate collection of particulates in the water box bypass 80 the section of pipe 80 is provided with a small diameter nipple 17, a check valve and an air hose 88 connected with an air injection port that purges any particulates out of the water box bypass 80. This air purge also creates a high pressure water surge into the dryer which serves to clean the agglomerate catcher 16 and the base screen support section 77 within base section 48 of the dryer 10.

The agglomerate catcher 16 can also be cleaned by a separate pipe or hose 90 controlled by a solenoid valve which directs high pressure fluid onto the pellet contact side of the angled agglomerate grate or catcher plate 20 to clean the bar rod grid 20 of agglomerates which are then discharged through the discharge tube or chute 18. The air purge from the water box bypass and hose 90 flushes all agglomerated pellets from the agglomerate catcher 16.

A hose 94 and nozzle 95 supply bursts of air to discharge chute or pipe 40 in a direction such that it cleans the top of the rotor 33 and the pellet discharge outlet 40. The air discharge blows any particulates past any pipe connections and the diverter valve 92 for discharge of dried pellets and other particles out of the dryer.

The rotor 33 is preferably turning continuously during the full cleaning cycle. Solenoid valves are provided to supply air preferably at about 60 psi to 80 psi, or more, to the water box bypass air port, rotor air ports, top section air port, pellet outlet air port and diverter valve air port. The solenoid valves include timers to provide short air bursts, preferably about three seconds, which cleans well and does not require a lot of time. A clean cycle button (not shown) activates the cleaning cycle with the water box bypass air port being energized first to allow air to purge the bypass with a multiplicity of air bursts, preferably five or more. The top section air port 110 is then activated. This is followed sequentially with activation of the pellet outlet chute diverter valve 95. This valve closes prior to activation of the spray nozzles 54 which wash the screen for one to ten seconds, preferably about six seconds. The blower must be deactivated during the water spray cycles and is then reactivated when the spray nozzle pump is de-energized thus completing one cleaning cycle. The cycle as herein described is not limited in scope and each component of the cycle may be varied in frequency and/or duration as necessitated to achieve appropriate removal of the residual particulates.

Analogous to Gala dryers exemplified in FIGS. 2-5, FIG. 6 illustrates an optional configuration with the motor 135 offset at the top of the dryer and operationally connected with a drive belt 190 to the drive pulley 192 and the rotor pulley 191. This allows the rotary union 170 and air inlet 171 to be attached to the top of the hollow rotor 33. Details of the drawing similarly numbered, follow those of FIGS. 2-5. Support platform 180 is attachedly connected to the top plate 47 on the dryer housing 26.

Optionally motor 160 which is controlled electrically, hydraulically, or pneumatically, may be attached to the top plate 47 as shown or to the support platform 180, not shown. This motor allows the adjustment of the spray tube 56 positionally to raise or lower the spray nozzle 54 enhancing the effectiveness of this component of the cleaning cycle. Motors 160 optionally are connected to each of the spray tubes and can be operated singly, multiply, or concurrently and simultaneously. The optional motors 160 described herein are applicable to all designs discussed heretofore and which follow hereinafter and are illustrated exemplary to any and all applications and designs whether illustrated or not.

Figure 7:
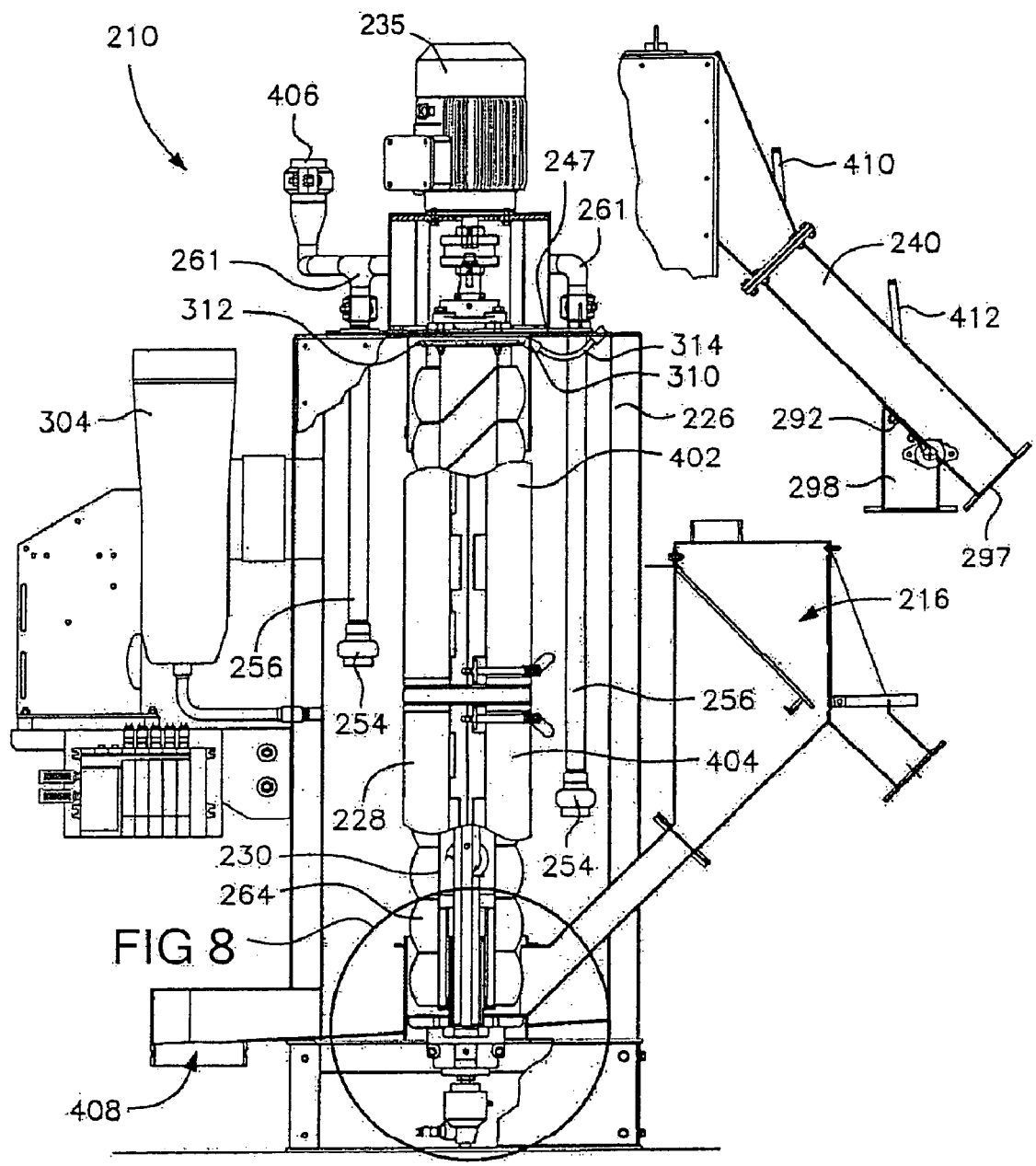
FIG. 7 is a schematic sectional view of yet another dryer embodying the present invention, similar to FIG. 2.
Figure 8:
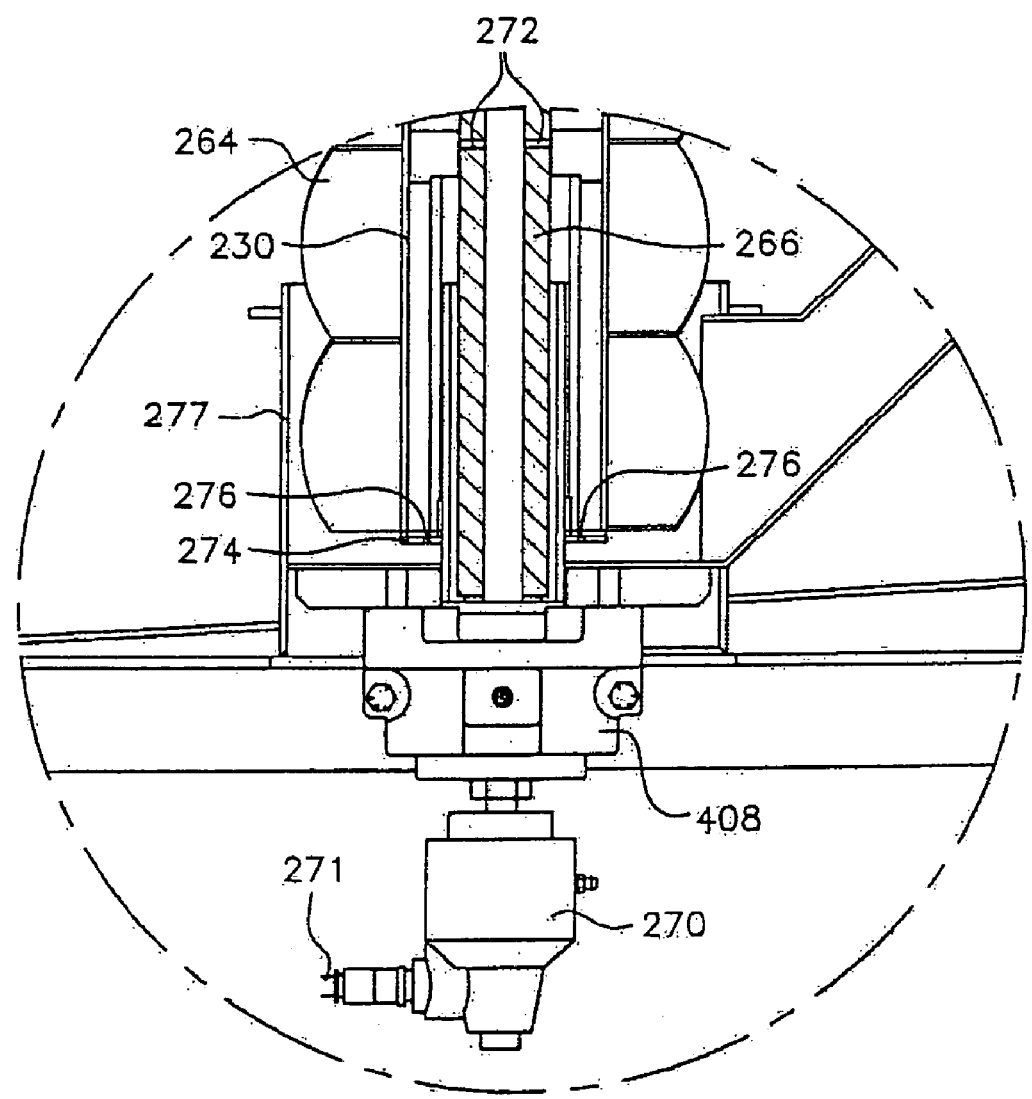
FIG. 8 is an enlarged detail sectional view from FIG. 7, similar to FIG. 3.

Turning now to FIGS. 7 and 8 of the drawings, an alternative style Gala dryer, modified to incorporate the structure and method of the present invention, is generally designated by reference numeral 210. Where possible like parts of the dryer 210 correspond with the dryer 10 of FIGS. 2-6, the numbers are the same, except that the numbers are preceded by the digit "2", or the 300 series is used for the 100 series in the FIGS. 2-6 embodiments. New components are numbered in the 400 series.

The self-cleaning apparatus in the FIGS. 7 and 8 embodiment includes three or more spray nozzles or spray heads 254 supported between the interior of the housing 226 and the exterior of the screen 228. The screen 228 is comprised of one or more sections wherein two sections, 402 and 404 are exemplarily described herein. The nozzles 254 are supported by spray pipes 256 extending upwardly through the top plate 247 and are connected by lines 261 to a single water inlet 406. The spray nozzles 254 preferably spray water or other liquid against the interior walls of the housing 226 and the exterior walls of the screen 228, with the water and captured particulates exiting the dryer through drain 408.

The rotor 233 is hollow and is provided with inclined rotor blades 264 around its exterior surface. A hollow shaft 266 extends through the hollow rotor 233 in concentric spaced relation thereto. The lower end of the rotor 233 is supported in bearing assembly 408, and the hollow shaft 266 extends through the bearing assembly 408 for connection to the rotary coupling 270 for connection to a source of high air pressure through hose or line 271.

The hollow shaft 266 includes apertures 272 to communicate with the interior of the hollow rotor 233, which holes 272 introduce the pressurized air into the interior of the rotor 233. The bottom of the rotor 233 in turn has apertures 276 in its bottom wall 274 which direct the pressurized air towards the bottom of the base or tub section 277, thus driving any accumulated particulates outwardly and upwardly into the rotating rotor 233 and rotor blades 264.

As shown in FIG. 7, the top of the rotor 233 is also subjected to high pressure air through nozzle 310, which directs the high pressure air across the top 312 of the rotor 233 and underneath the top plate 247. Hose or line 314 connects the nozzle 310 to a source of high pressure air.

The discharge chute or pipe 240 of the FIGS. 7 and 8 embodiment is shown separately since it can be installed either on the front or back of the dryer 210, as shown in FIG. 7. In this embodiment, there are separate nozzles for the discharge pipe 240 and the diverter valve 292. Specifically, air hose 410 feeds a nozzle which directs high pressure air down the discharge chute 240, and air hose 412 directs high pressure air directly at the diverter valve 292.

Figure 9:
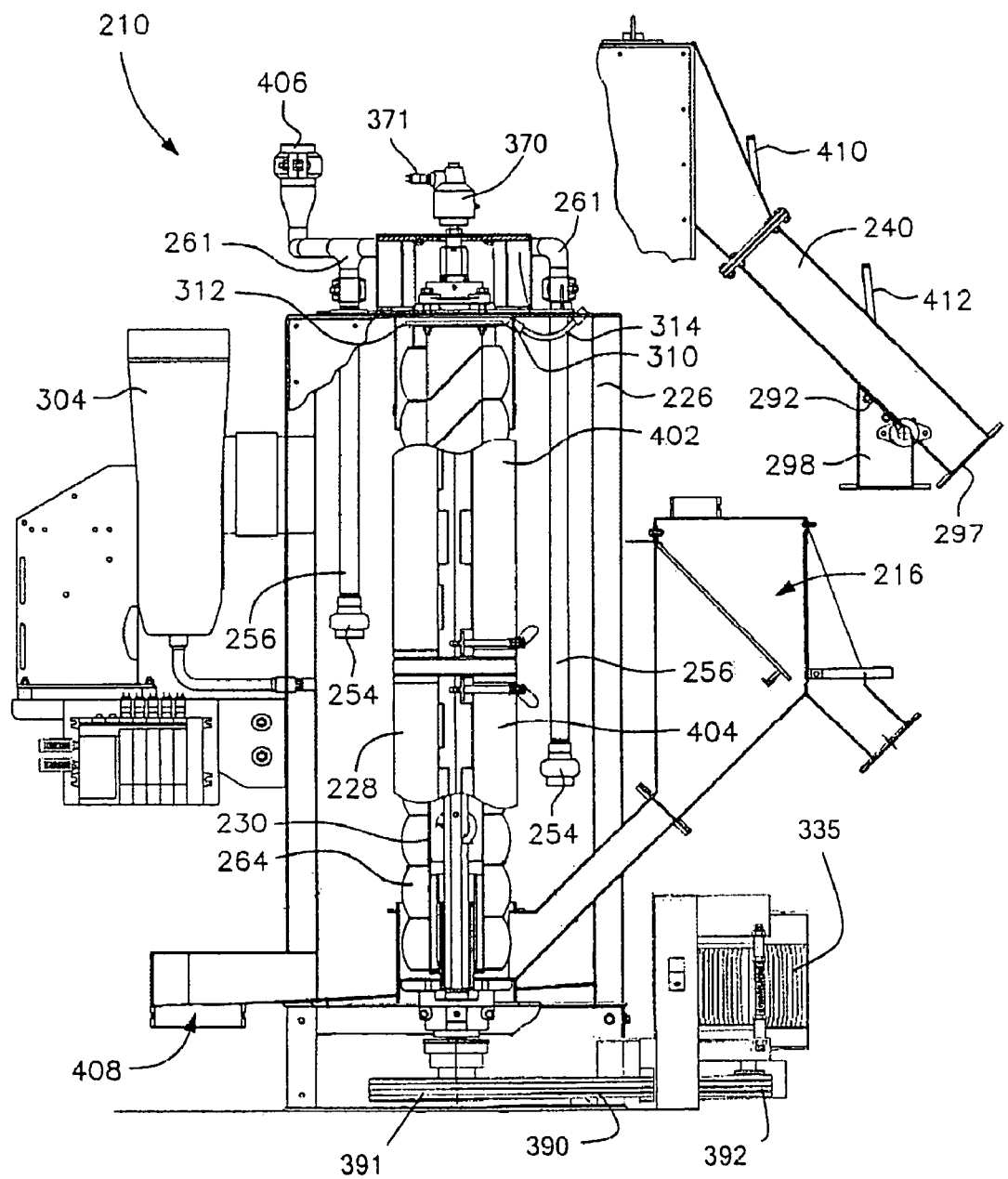
FIG. 9 is a schematic sectional view of still another dryer embodying the present invention, similar to FIG. 7, but illustrating an offset motor and pulley drives at the base.

Analogous to dryers exemplified in FIGS. 7-8, FIG. 9 illustrates an optional configuration with the motor 335 offset at the bottom of the dryer and operationally connected with a drive belt 390 to the drive pulley 392 and the rotor pulley 391. This allows the rotary union 370 and air inlet 371 to be attached to the top of the hollow rotor 233. Details of the dryer shown in FIG. 9, similarly numbered, follow those of FIGS. 7-8.

Based upon the foregoing description, taken together with the patent drawings, one skilled in the art should readily be able to establish a time cleaning sequence for the high pressure water and high pressure air flushing of any particular centrifugal pellet dryer. However, for further guidance, a self-cleaning process in accordance with the present invention utilizing the FIGS. 7 and 8 embodiment will hereafter be described.

The operator would start the self-cleaning process by pressing a "Start Cleaning Cycle" button associated with the programmable logic controller or PLC. Not intending to be limited, an exemplary cleaning cycle is illustrated as follows:

Step 1: the water box bypass piping solenoid would energize the valve to air hose 88 to pulse air on for three seconds to create a high pressure water surge into the dryer, and then turn the air supply off for three seconds. This on/off sequence should be repeated five times;

Step 2: the top section solenoid is then energized pulsing air through nozzle 310 for three seconds and then off for three seconds. This sequence is repeated five times;

Step 3: the pellet resin outlet solenoid is then energized to pulse air through line 410 for three seconds and then off for three seconds; this sequence repeated five times;

Step 4: the pellet diverter valve solenoid is then energized to pulse air through line 412 for three seconds and then off for three seconds; this sequence also repeated five times;

Step 5: the blower motor for blower 304 is de-energized;

Step 6: the cleaning pump motor for delivering high pressure water to the spray nozzles 254 is energized, thus causing high pressure water spray to exit spray nozzles 254, for a period of six seconds;

Step 7: the blower motor for blower 304 is then re-energized; and

Steps 1-7 are then repeated automatically for five consecutive sequences. Upon completion of the fifth sequence, the cleaning cycle is complete.

As mentioned previously, the rotor 233 is rotating during the complete cleaning process, as well as during the normal drying process. Hence, the rotor is on continuously, thus causing very little down time for the dryer. It is only necessary to run the cleaning cycle (while the rotor 233 is continuing to turn) when switching over to a new pellet material to be dried. As is reasonable to one skilled in the art, the cleaning process herein described is applicable to operation at any time throughout operation. Similarly, number of component operations, frequency, and duration of the events within the cycle are not limited in scope as detailed by the example cited.

Additional areas for the self-cleaning apparatus and process of the present invention are illustrated in FIGS. 10-13. A self-cleaning dryer 510 of the present invention is illustrated in FIG. 10 with a dewatering device, generally designated by reference numeral 513. The dewatering device 513 includes two vertical dewatering screens 523, an angle feed screen 528, and angular baffles positionally shown as an X-configuration radially and centrally contained within the vertical dewatering screen or screens 523. Dryers of the current invention optionally contain the feed screen 528 and one or more dewatering screens 523. FIG. 11 shows an expanded illustration of the dewatering device 513 with one vertical dewatering screen 523, housing 522, flange 529 and X-configuration baffles 524. FIG. 12 shows a cross-section of the dewatering screen 523, along line B-B of FIG. 11, indicating the screen connector 521. Spray nozzles 554 are attached to spray pipes 556 which connect through the top of the dewaterer housing 522 to communicate with a pressurized water source through piping 560 and 561. The spray nozzles 554 effectively clean the inside and outside of the dewatering screen or screens 523 and baffles 524. The feed screen 528 is cleaned by high water pressure or high air pressure introduced to the spray nozzles 610 through hoses 562 directly communicated thereto and affixed to the side wall of the dewatering housing 522 at the upper end of the angled feed screen 528 and angled in parallel with the feed screen.

Figure 13:
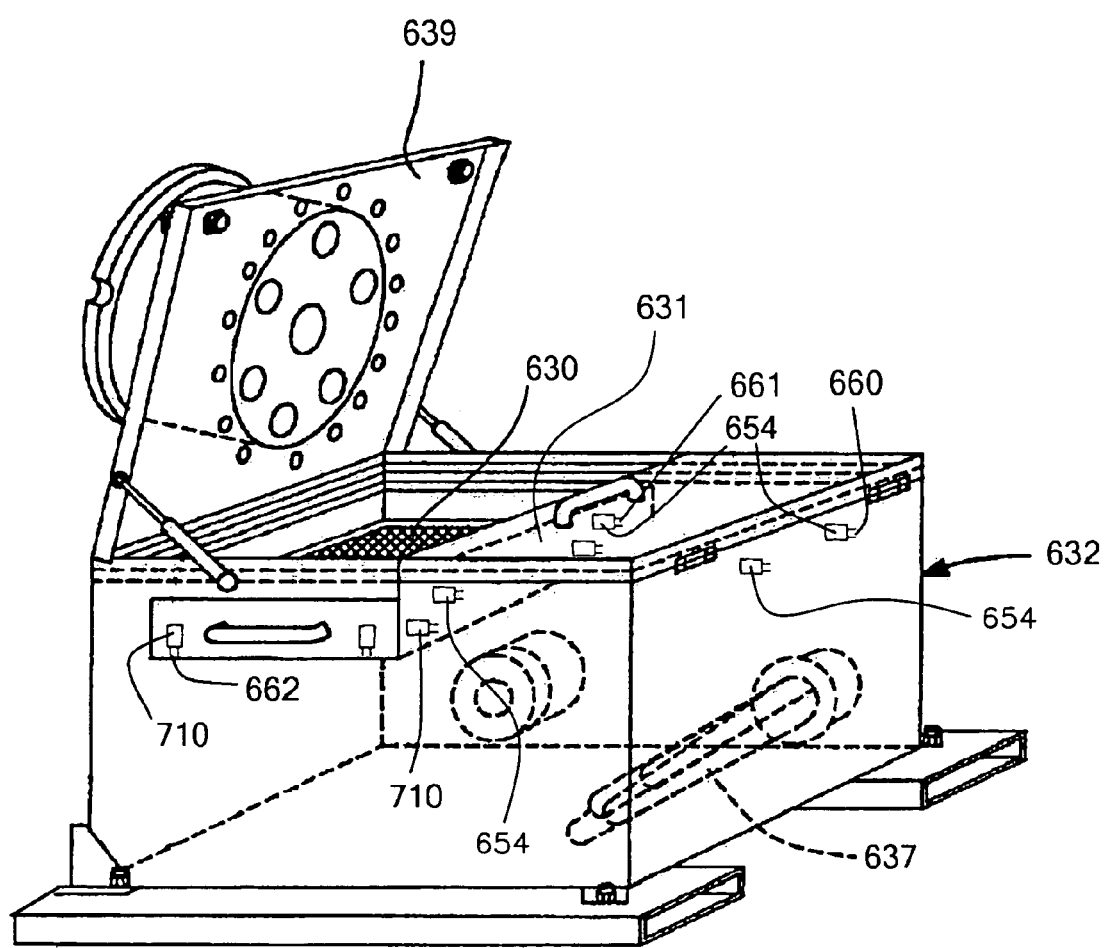
FIG. 13 is a schematic sectional view of a water tank and fines removal screen in accordance with the present invention and illustrating the spray nozzle positioning.

FIG. 13 illustrates a water tank or reservoir, generally designated by reference numeral 632, in accordance with the present invention. The water tank 632 includes optional heating element 637, lid 639, raised as illustrated, and fines removal screen 630. Spray nozzles 654 are peripherally positioned linearly along the upper wall 655 of the reservoir and in the housing 631 above the upper surface of the fines removal screen 630. Spray nozzles 654 are affixedly attached to the walls and connected directly to pressurized water through pipe 660 for the tank 632 and pipe 661 for the screen housing 631. Two or more spray nozzles described above are located on each side and peripherally around the tank 632 and fines removal screen housing 631. Pressurized water or pressurized air is introduced through hose 662 to spray nozzles 710 positionally arrange peripherally around the underside of the fines removal screen 630 and fixedly attached to the screen housing 631. Two or more spray nozzles are arranged on each side of the housing as illustrated.

Screens for the present invention as identified throughout the embodiments herein described include cylindrical stand alone, hinged cylindrical, or wrap around styles and may be plastic, wire-reinforced plastic, or metal compositionally and structurally which may be molded, punched, pierced, perforated, slotted or woven in one or more similar or different layers. The layers may be unattachedly connected or may be adhered by chemical bonding, thermal bonding, welding, soldering, brazing, resistance welding, sintering or diffusion bonding or equivalent adhesional technique known to those skilled in the art. The plastic may include polyethylene, polypropylene, nylon or polyamide, polyester, polyurethane or structurally sound material. The metal compositionally may include copper, brass, bronze, tin, iron, steel, aluminum or aluminum alloys, zinc or zinc alloys, nickel steel, stainless steel or alloys, titanium or titanium alloys, platinum or analogous metal appropriate to chemical compatibility requirements of the plastic particles being processed. The structural components of the screen may be wire, rod, or bar and may be round, oval, square, rectangular, triangular or wedge-shaped, hexagonal, or polygonal in cross-section. Structural dimensions are limited dimensionally only through requirements related to the percent open area needed to effect the necessary dewatering, drying, or fines removal.

While the invention has been described specifically with respect to centrifugal pellet dryers, for which it is especially preferred, the cleaning apparatus and method of this invention can also be adapted to dryers associated with other forms of pelletizers, such as strand, dice, water ring, and hot face pelletizers as well as to other plastic particulates including flakes not limited to production or manufacture by pelletization. It is not intended that the present invention be limited specifically to centrifugal pellet dryers.

The foregoing is considered as illustrative only of the principles of the invention. Further, numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A self-cleaning centrifugal dryer system for removing surface moisture from pelletized product in the form of a slurry of pellets and water and removing particulates from the dryer system after each drying cycle comprising an agglomerate catcher having an agglomerate catcher grate, a dewaterer having at least one dewatering screen and a centrifugal pellet dryer having a housing, a screen mounted within said housing in spaced relation to the housing, a pellet lifting rotor positioned within said screen, a motor drivingly connected to said rotor, and fluid pressure spray nozzles positioned interiorly of said housing for discharging pressurized fluid toward said agglomerate catcher grate, said dewatering screen and said dryer screen, rotor and housing for removing particulates from said dryer system to eliminate contamination of material being dried in a subsequent drying cycle.

2. The dryer system as claimed in claim 1, wherein said spray nozzle assembly includes nozzles spaced circumferentially around the screen and in radially spaced relation to the interior of the housing and the exterior of said screen for cleaning the surfaces of the screen and housing.

3. The dryer system as claimed in claim 2, wherein said spray nozzles are positioned in staggered vertical position in relation to said screen and housing to clean all surfaces of the screen and housing.

4. The dryer system as claimed in claim 1, wherein said rotor includes a hollow shaft positioned in an elongated vertical hollow body, said hollow shaft including a rotary connection to a source of pressurized fluid said hollow shaft including passages communicating the hollow shaft with the interior of the hollow body of the rotor, said rotor including a bottom having apertures therein for discharging pressurized fluid into a lower section of said housing for dislodging pellets and plastic particles and flakes from said lower section of said housing.

5. The dryer system as claimed in claim 1, wherein said slurry inlet is positioned at a lower end of said housing, said dried pellet outlet is positioned at an upper end of said housing, and said motor is mounted on said upper end of said housing.

6. The dryer system as claimed in claim 1, wherein an agglomerate catcher is positioned in advance of said slurry inlet for removing pellet agglomerates from said slurry before entering said slurry inlet.

7. The dryer system as claimed in claim 1, wherein a pellet dewaterer is positioned in advance of said slurry inlet to remove bulk water from said pellet and water slurry before said pellets enter said slurry inlet.

8. The dryer system as claimed in claim 1, wherein said dried pellet outlet includes a discharge chute and a diverter valve in said chute to enable the discharge of dried pellets to selected discharge openings.

9. The dryer system as claimed in claim 6, further comprising a cleaning spray nozzle associated with said agglomerate catcher for directing pressurized fluid against an agglomerate screen to clean agglomerates from said screen for discharge from said agglomerate catcher.

10. The dryer system as claimed in claim 8, further comprising a cleaning spray nozzle associated with said discharge chute for directing high pressure fluid to dislodge pellets, plastic particles and flakes from said diverter valve and to clean said dried pellet outlet and said upper end of said housing and rotor.

11. The dryer system as claimed in claim 1, further comprising an underwater pelletizer and a slurry pipe circuit associated with said dryer, including a water box bypass pipe provided with a high pressure fluid nozzle for injecting high pressure fluid into said bypass pipe to clean said bypass pipe and cause a high pressure water surge into said dryer.

12. A method of self-cleaning a centrifugal pellet dryer system including an agglomerate catcher having an agglomerate catcher grate, a dewaterer having at least one dewatering screen and a centrifugal dryer having a housing, a screen mounted within said housing in spaced relation to the housing, a pellet-lifting rotor positioned within said screen, and a motor drivingly connected to said rotor, in which dried particulates become lodged in hang-up points in said agglomerate catcher, dewaterer, and dryer, said method comprising the steps of directing high pressure fluids in a timed sequence from spray nozzles selectively positioned inside said agglomerate catcher, said dewaterer, and said dryer toward said hang-up points.

13. The method as claimed in claim 12, wherein said high pressure fluids includes water flowing at a rate of at least 40 gpm.

14. The method as claimed in claim 12, wherein said high pressure fluids includes air at a pressure of at least 60 psi.

15. A method of self-cleaning a centrifugal pellet dryer having a housing, a screen mounted within said housing in spaced relation to the housing, a pellet-lifting rotor positioned within said screen, and a motor drivingly connected to said rotor, in which dried pellets become lodged in hang-up points in said dryer, comprising directing high pressure fluids in a timed sequence from nozzles selectively mounted between an interior of said housing and an exterior of said screen toward said hang-up points.

16. The method as claimed in claim 12, wherein said dryer system includes a water box bypass line having at least one valve for operation thereof, and said method further comprising the step of injecting high pressure gas into said bypass line to purge particulates from hang-up points therein.

17. The dryer system of claim 1, further comprising a water box bypass line having at least one valve for operation thereof, and a gas inlet to inject pressurized gas to purge particulates from hang-up points in said bypass line.

18. The method as claimed in claim 16, wherein said gas is air.

19. The method as claimed in claim 12, wherein said high pressure fluids include water flowing at a rate of between about 80 gpm and about 100 gpm.

* * * * *